Patented June 6, 1950

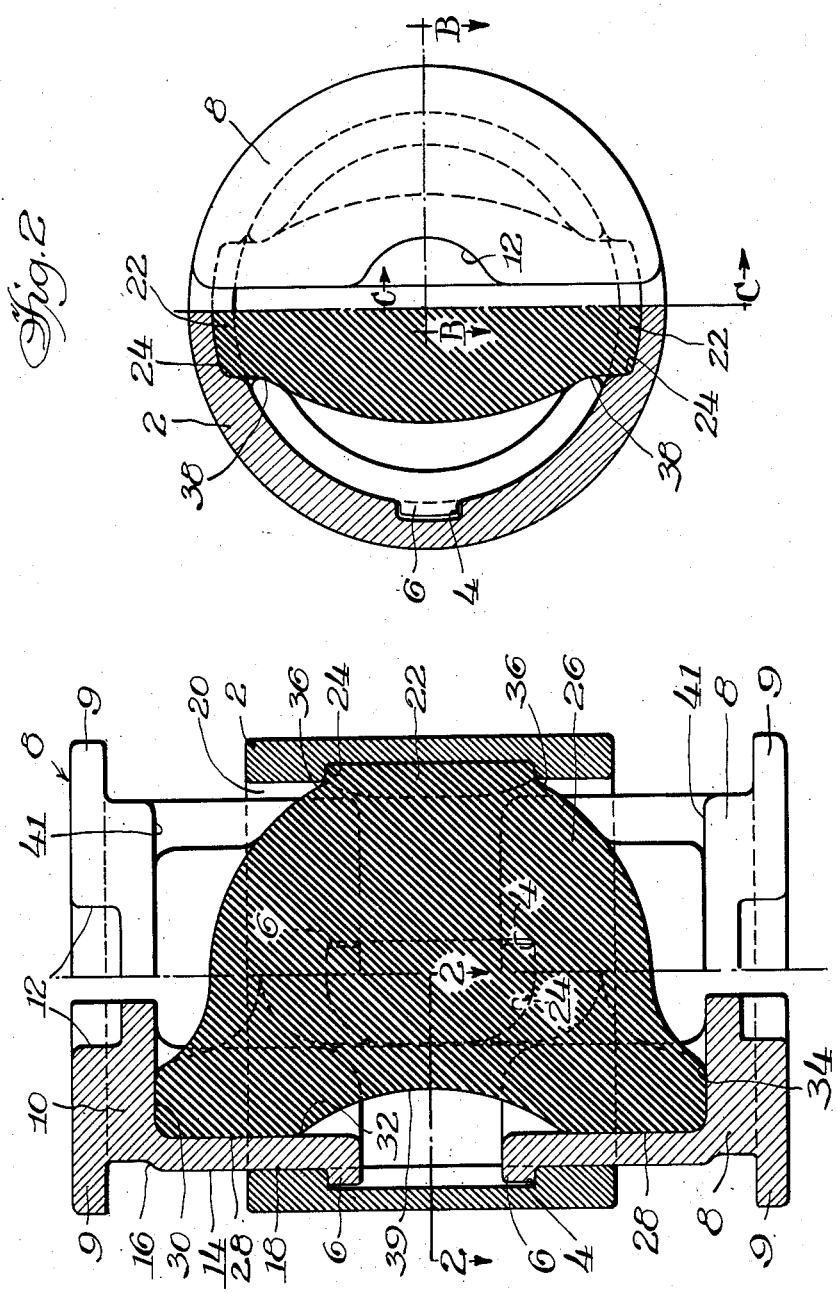

2,510,259

UNITED STATES PATENT OFFICE 2,510,259

SNUBBER

Walter L. Schlegel, Jr., and Fred E. Bachman, Chicago, Ill., assignors to American Steel Foundries, Chicago, Ill., a corporation of New Jersey Application March 12, 1945, Serial No. 582,298

21 Claims. (Cl. 267—9)

Our invention relates to a friction device and more particularly such an arrangement of design and dimension suitable for substitution for a standard coil spring in the spring group of a railway freight car truck. At the same time, it will be understood that the design is suitable for other purposes and arrangements.

The general object of our invention is to devise a snubber or friction device with relatively simple parts, substantial wearing surfaces satisfactory for long life, and including a single resilient member which serves to maintain all the parts in their relative operating position.

A further object of our invention is to devise a simple friction device comprising a single friction ring engaged top and bottom by two-piece followers which are maintained in position thereagainst by a single resilient member compressed between the followers.

A different object of our invention is to devise such a structure as that described wherein each follower may comprise two identical portions and in which each portion may be interlocked with the friction ring, thus retaining the whole device in proper assembled relationship.

Still another object of our invention is to devise a friction structure wherein the friction ring may be maintained in its normal position relative to the followers by means on the single resilient member interlocked with said friction ring in such manner that when the device is compressed, the top and bottom followers will move substantially equally toward the middle of the friction ring, thus preventing unequal wear of the parts. Our invention also contemplates such an arrangement as that described wherein the single resilient element and the metal parts may cooperate along contour lines of such character as to prevent undesirable abrasive action therebetween.

Our novel structure also comprehends an arrangement having identical two-piece followers with identical halves comprising two identical members so that in the manufacturing operation only three pieces are required, a single form of follower member, a single type of friction ring, and one resilient element. Of course, four of the identical follower elements are utilized in each device.

In the drawings:

Figure 1 is a composite sectional view, the left half thereof being taken in the vertical plane bisecting the device along the axis indicated at B—B in Figure 2 and the right half thereof being taken in a vertical plane at right angles thereto substantially along the axis indicated by the line C—C of Figure 2.

Figure 2 is a top plan view, half in section, the section being taken substantially in the horizontal plane bisecting the device as indicated by the line 2—2 of Figure 1.

Our novel device comprises the friction ring generally designated 2, said ring being of cylindrical form and having at diametrically opposite sides thereof vertical slots 4, 4 for accommodation of interlocking outwardly projecting lugs 6, 6 which may be centrally formed on the inner extremity or perimeter of each of the identical follower members 8, 8 at the top and bottom of the device. The two follower members 8, 8 at each end of the device constitute a hollow structure of barrel-like form with a base portion 10 having the cavity at 12 for accommodation of positioning means and the cylindrical wall 14 relieved as at 16 to avoid wearing shoulders. Each cylindrical wall 14 may have frictional engagement as at 18 with the inner cylindrical wall or friction surface 20 on the friction ring 2. If desirable, the cylindrical engaging surfaces at 18 on the follower and ring may be given a slight inclination, thus causing slight movement of the members of each follower toward each other as the device is compressed.

The friction ring 2 may also have on its inner face diametrically opposite vertically elongated cavities 24, 24 for reception of positioning lugs 22, 22 at opposite sides of the intermediate portion of resilient element 26, said cavities 24, 24 being positioned therealong a diameter approximately at right angles to that on which are positioned the interlocking slots 4, 4. The resilient element 26 may have end portions providing substantial bearing or seating surfaces as at 28 against the vertical cylindrical wall 14 of each follower member as well as substantial bearing or abutment surfaces as at 30 against the horizontal wall or base 10 of each follower member and at the edges of these bearing areas as at 32, 34 the resilient element 26 may be formed with smooth radii to avoid sharp changes in stresses therewithin under operative conditions. Similarly, at the edges of the lugs 22, 22 smooth radii may be formed as at 36; also, the vertical lateral edges on the walls 14, 14 of the follower members 8, 8 may be smoothly rounded, as well seen at 38 (Fig. 2), to permit the smooth flowing therealong of the surface of the resilient member 26 as it may be compressed under operating conditions. The resilient element 26 may have substantial relieved areas at each side of the intermediate portion thereof, as well seen at 39 in the section at the left of Figure 1, to afford clearance for the inner ends of the followers and to accommodate distortion of the element during compression of the device and considerable flowing space may also be permitted within and between the portions of followers 8, 8 as seen at 41, 41 in the section at the right by means of cavities in the remote extremities of the end portions of element 26.

The friction ring 2 may be of any suitable height as long as sufficient clearance is permitted between the top and bottom edges thereof and the annular flanges 9, 9 formed at the outer perimeter of the follower members 8, 8.

It will thus be seen that we have devised a novel form of friction device having only two forms of metal parts and a single resilient element, four identical metal parts being used for respective followers which may cooperate with a single friction ring and with the resilient element when the device is assembled in operative form. In this arrangement substantial friction areas are provided. The parts are designed to accommodate the satisfactory flow of the resilient element compressed therebetween and substantial bearing area of the resilient element is provided against every metal part in such directions as to maintain the parts in their proper assembled relationship for satisfactory operation.

It is to be understood that we do not wish to be limited by the exact embodiment of the device shown which is merely by way of illustration and not limitation as various and other forms of the device will, of course, be apparent to those skilled in the art without departing from the spirit of the invention or the scope of the claims.

We claim:

1. A friction device comprising spaced identical two-piece followers, a friction ring surrounding portions of said followers in interlocking relationship therewith, and a single resilient element compressed between and engaging said ring and followers, said resilient element having positioning means for said ring to equalize the relative movement between said ring and respective followers as said device is compressed, said interlock between said ring and followers comprising a vertical slot in said ring and lugs on respective followers, said interlock and said positioning means being arranged along diameters approximately at right angles to each other in said device.

2. A friction device comprising spaced identical two-piece followers, a friction ring surrounding portions of said followers in interlocking relationship therewith, and a single resilient element compressed between and engaging said ring and followers, said resilient element having positioning means for said ring to equalize the relative movement between said ring and respective followers as said device is compressed, said interlock between said ring and followers comprising a vertical slot in said ring and lugs on respective followers.

3. In a friction device, top and bottom identical two-piece followers, a cylindrical ring in frictional engagement with portions of said followers, a single resilient element under compression between and engaging said ring and followers and affording positioning means for said ring to equalize the relative motion of said followers with respect thereto as said device is compressed, and interlocking means on said ring and followers to limit expansion of said device.

4. In a snubber, spaced identical followers each comprising a plurality of identical members, a friction ring surrounding portions of said followers for frictional engagement therewith, a single resilient element compressed between and engaging said ring and followers, interlocking means on said followers and ring, and interengaging positioning means on said element and ring, said interlocking and positioning means being arranged along axes approximately at right angles to each other.

5. A friction device comprising spaced identical two-piece followers, a friction ring surrounding portions of said followers in interlocking relationship therewith, and a single resilient element compressed between and engaging said ring and followers, said resilient element being operative to urge said followers away from each other and into engagement with said ring and affording positioning means for said ring.

6. A friction device comprising spaced identical two-piece followers, a friction ring surrounding portions of said followers in interlocking relationship therewith, and a single resilient element compressed between and engaging said ring and followers, said resilient element having positioning means for said ring to equalize the relative movement between said ring and respective followers as said device is compressed.

7. In a friction device, top and bottom identical two-piece followers, a cylindrical ring in frictional engagement with portions of said followers, and a single resilient element under compression between and engaging said ring and followers and affording positioning means for said ring to equalize the relative motion of said followers with respect thereto as said device is compressed.

8. In a snubbing device, a friction cylinder, multipiece followers having their adjacent ends in frictional engagement with said cylinder, a resilient element under compression between said cylinder and followers and operative to position said cylinder with respect to said followers as said device is compressed, interlocking means on said cylinder and followers to limit expansion of said device, and interengaging positioning means on said element and cylinder, said positioning means comprising pockets interrupting the inner surface of said cylinder and outwardly extending protuberances on said element fitting into said pockets.

9. In a friction device, a friction ring comprising spaced internal friction surfaces and spaced internal pockets at opposite sides thereof, said surfaces and said pockets being respectively arranged along diameters at right angles to each other, a plurality of members extending into each end of said ring in frictional engagement with said surfaces, the members at each end of said device affording a seat therefor against an associated element, and a block of resilient material with radially extending protuberances fitting into said pockets, said material being compressed between said ring and all of said members and affording a direct force path between each of said members and every other thereof.

10. In a snubber, spaced identical followers each comprising a plurality of identical members, a friction ring surrounding portions of said followers for frictional engagement therewith, a single resilient element compressed between and engaging said ring and followers, interlocking means on said followers and ring, and interengaging positioning means on said element and ring.

11. In a snubber, spaced identical followers each comprising a plurality of identical members, a friction ring surrounding portions of said followers for frictional engagement therewith, a single resilient element compressed between and engaging said ring and followers, and interengaging positioning means on said element and ring.

12. In a friction device, a friction ring, spaced followers projecting into opposite ends of said ring in frictional engagement therewith, each of said followers comprising a plurality of members, and resilient means under compression affording a direct force path between said ring and each of said members.

13. In a snubber, a friction cylinder, followers at each end of the cylinder having their adjacent ends in frictional engagement with said cylinder, and a block of resilient material under compression between and engaging said cylinder and followers exerting equal pressure against all of said followers and operative to position said cylinder with respect to said followers as said snubber is compressed.

14. A spring for a friction shock absorber comprising a block of flowable resilient material having external abutment surfaces at opposite ends of the block and a pair of external abutment faces at opposite sides of the block, a recess in said block between each pair of faces for accommodating distortion of said block when compressed, a recess in each surface for accommodating distortion of said block when compressed, and positioning means intermediate the ends of the block and alternately arranged with respect to the recesses around the periphery of the block for positioning an associated snubber part.

15. In a snubber, a block of resilient material, a friction member surrounding a portion of said block, interlocking means on said block and member positioning said member with respect to said block, a plurality of followers seated upon respective ends of said block and having portions extending between said member and block and frictionally engaged with the former for slidable movement thereagainst during actuation of the snubber, said portions and member having slidable interlocking engagement with each other for limiting the expansion of said snubber.

16. A snubber comprising a hollow friction element, followers at each end of the snubber having their adjacent ends projecting into and frictionally engaging the element, and a mass of flowable resilient material bearing against and affording a direct force path between the element and each follower.

17. In a friction device, a friction cylinder, a block of resilient material compressed and fitted into said cylinder and having its opposite ends extending beyond the top and bottom edges of said cylinder, followers seated upon respective ends of said block and extending within said cylinder in slidable and frictional engagement therewith, and interlocking means on said followers and said cylinder comprising a lug on each of said followers and complementary slots within said cylinder.

18. In a snubbing device, a plurality of complementally arranged followers at each end of the device, resilient means interposed between all of said followers and reacting thereagainst axially and transaxially of said device, a friction element surrounding all of said followers and said resilient means intermediate the ends of said device and frictionally engaging said followers, and interengaging means on said resilient means and said element for positioning the same with respect to each other.

19. A snubber comprising a friction ring, followers at each end of the snubber having their adjacent ends projecting into and frictionally engaging the ring, the remote ends of said followers having means affording seats for the snubber against associated relatively movable parts, and a mass of flowable resilient material reacting against and affording a direct force path between each follower and every other follower.

20. A friction device comprising a ring, a pair of followers extending into each end of said ring and in frictional engagement therewith, a block of resilient material compressed between said pairs of followers and between the followers of each pair and engaging the same for urging said pairs of followers apart and the followers of each pair into said engagement with said ring, projections on the sides of said block extending between the followers of each pair into recesses in said ring for positioning the ring with respect to said block, said block having recesses in the sides thereof in areas immediately adjacent the innermost portions of said followers within said ring to afford clearance for said portions during relative movement between said followers and said ring, said block having recesses in portions thereof remote from said ring, all of said recesses accommodating distortion of said block upon compression thereof during closure of the device.

21. A friction ring for a snubbing device comprising an annular member presenting spaced diametrically opposed internal friction surfaces extending from end to end of said member, a central slot in each surface adapted for reception of interlocking means on an associated friction element, and diametrically opposed internal spring-positioning means arranged substantially at right angles to said slots circumferentially of said member and disposed between adjacent lateral edges of respective surfaces.

WALTER L. SCHLEGEL, JR.
FRED E. BACHMAN.

REFERENCES CITED

The following references are of record in the file of this patent:

UNITED STATES PATENTS

| Number | Name | Date |
|---|---|---|
| 736,724 | Handiges | Aug. 18, 1903 |
| 751,943 | Ritter | Feb. 9, 1904 |
| 754,676 | Moore | Mar. 15, 1904 |
| 839,203 | Ritter | Dec. 25, 1906 |
| 1,057,521 | Berger | Apr. 1, 1913 |
| 1,882,801 | Geiger | Oct. 18, 1932 |
| 2,229,750 | Lindstrom | Jan. 28, 1941 |
| 2,306,392 | Light | Dec. 29, 1942 |
| 2,306,394 | Light | Dec. 29, 1942 |